UNITED STATES PATENT OFFICE.

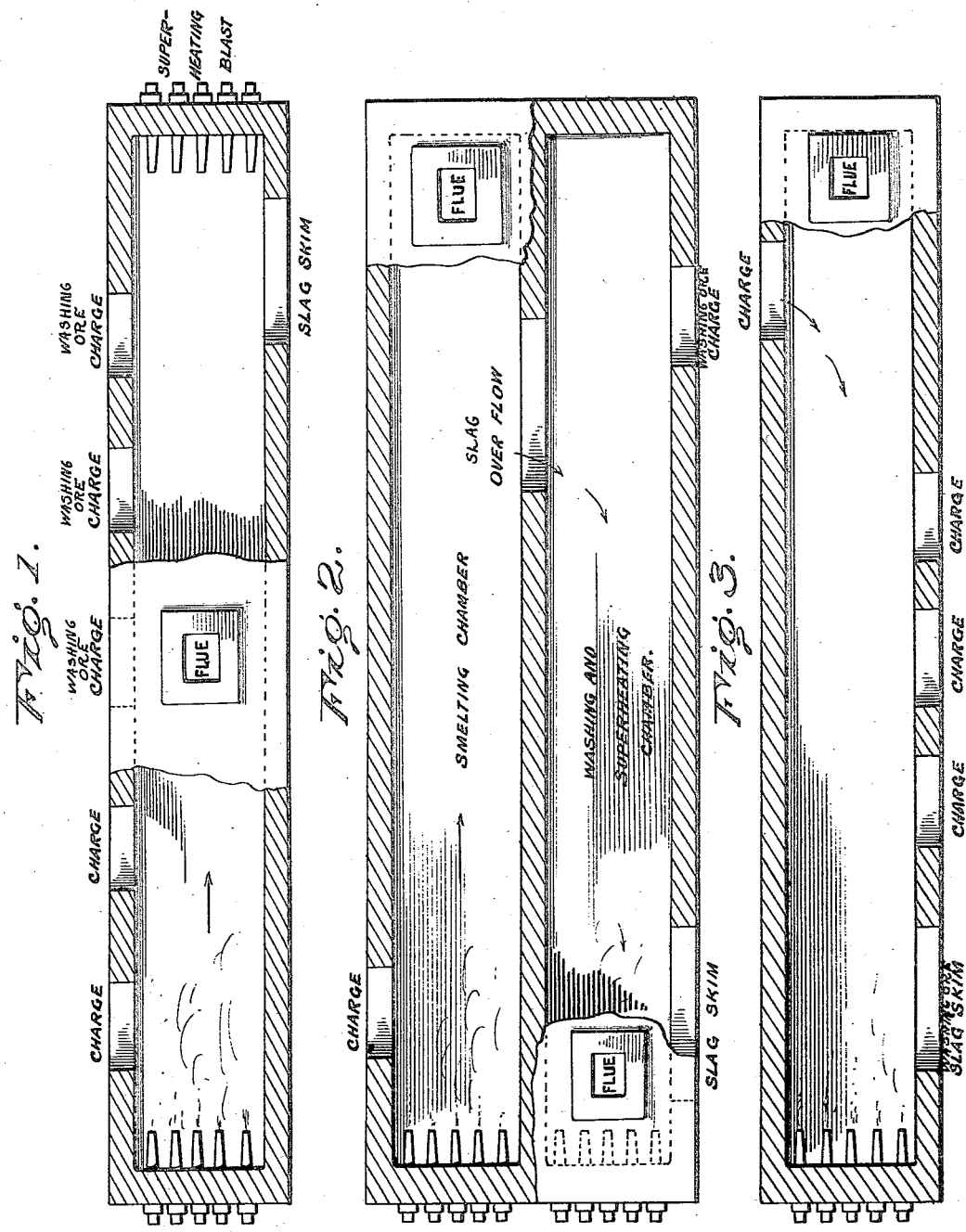

PERCIVAL PAGE BUTLER AND HARRY HOWARD STOUT, OF DOUGLAS, ARIZONA, ASSIGNORS OF FIFTY-FIVE ONE-HUNDREDTHS TO PHELPS DODGE CORPORATION, A CORPORATION OF NEW YORK.

PROCESS AND APPARATUS FOR EXTRACTING COPPER FROM SLAG IN REVERBERATORY FURNACES.

1,416,262.  Specification of Letters Patent.  Patented May 16, 1922.

Application filed July 7, 1919. Serial No. 309,129.

*To all whom it may concern:*

Be it known that we, PERCIVAL PAGE BUTLER and HARRY HOWARD STOUT, citizens of the United States, residing at Douglas, in the county of Cochise and State of Arizona, have invented certain new and useful Improvements in Processes and Apparatus for Extracting Copper from Slag in Reverberatory Furnaces, of which the following is a specification.

It is a well known fact that in the smelting of copper ores in a reverberatory furnace, an appreciable and sometimes considerable amount of copper is carried away in the slag and usually is a total loss, as heretofore attempts to treat the slag for the purpose of extracting the copper content have, generally speaking, proven to be failures. As a general rule, if in the smelting of the ore a matte containing 40% copper is produced, the resulting slag will contain .04% copper; if the matte produced contains 30% copper, the slag will contain .03% copper, etc. Theoretically it would be advisable to produce a matte, for example, 10% copper, in which event the slag would contain only .01% copper, but commercially this is impractical as the production of the great amount of matte would be very costly and the better practice has therefore been considered to be to produce a higher grade matte, attempts being made to subsequently treat the slag to extract the copper carried away therein. As stated, however, such attempts have usually been utter failures.

In the ordinary operation of reverberatory furnaces, in the extraction of copper, the skimming end of the furnace, which is the end remote from the firing or blast end and which is the end from which the slag is skimmed or discharged, is so low in temperature that complete fusion of the washing ore is not obtained, and we have discovered that the washing ore, and in fact the larger particles of the charge are carried down to the skimming end, without being fused, and pass out with the slag, causing of course an increase loss of copper.

The primary object of the present invention, in consideration of the waste of copper through being carried away with the slag in the ordinary reverberatory furnace practice, is therefore to devise a process in the carrying out of which the slag within the reverberatory furnace will be washed of substantially all of its copper content and complete fusion of all particles whether of the original charge or of the washing ore will be effected.

We have discovered that if fluent washing ore is distributed or disposed over the surface of the slag in the reverberatory furnace, while the furnace is in operation, and the entire charge is superheated, the resulting slags will be very much reduced in their copper content, provided that the fluent washing ore is such that the matte from this ore per se, which is formed during its fusion, is of low copper content and high in iron sulphide, and that the fluent washing ore is not so high in specific gravity that it will fall through the molten slag in the furnace and enter the matte collected in the bottom of the furnace without fusion being effected, and provided further that the slag formed from the fluent washing ore per se is such that it will combine with the remainder of the slag to be washed and form a fusible compound. This constitutes the broad idea of our invention and the process may be carried out in various types of furnaces as will be hereinafter explained. A specific example of the process may, however, be stated as follows:

Assuming that in the smelting end of the reverberatory furnace or, in other words, the firing or blast end, a matte containing 35% copper is produced and that the resulting slag under normal conditions contains .035% of copper and under such conditions would carry with it to the skimming end of the furnace some unfused large sized particles of the washing ore, we would spread uniformly over the surface of this slag fluent washing ore of such character that the matte therefrom would contain approximately 10% copper, and we would then superheat the entire charge during the operation of the furnace in a manner which will be presently made apparent. The amount of fluent washing ore required to be spread over the slag within the reverberatory furnace would depend upon the amount of this ore, producing a 10% copper matte, which it would be necessary to add to the slag to be treated so that the matte produced from the washing ore when combined with the copper matte prills already in the slag from the original charge would yield a copper matte prill of approximately 15% copper. The combination of the matte from the washing ore with the copper matte prills already in the slag will, as will be readily understood, produce matte prills of increased size and weight which will settle out of the slag more rapidly and completely when the combination is heated so as to lower the viscosity of the mass and effect complete fusion of the larger sized particles of the original charge as well as the fluent washing ore. In practice we have found that with increase in size and weight of the copper matte prills, the necessity for superheating is proportionately reduced so that, for example, if sufficient fluent washing ore is added to the slag so that the matte prills are increased to approximately three times their original size and weight, the settling out of the prills may be obtained by less superheating of the mass. Of course, within the purview of the invention the quantity of washing ore to be added and the extent of superheating will vary depending upon the composition of the original slag to be cleaned, and likewise if there is quite an amount of very large sized particles of the original charge remaining unfused on the surface of the slag while the slag is being treated, it will be necessary to superheat to a proportionately higher degree and for a longer period of time in order to insure the complete fusion of these particles.

From the foregoing it will be evident that the principles involved in the process of the present invention are, first, the complete fusion of all ore particles whether they be from the original charge or from the fluent washing ore employed, the superheating of the slag produced to reduce its viscosity and thereby permit more rapid and ready settling out of the substituted matte prills, the giving of a quiescent period of time for the matte prills to settle out and for low grade matte to form and combine with the original matte prill to effect, by such settling of the prills, a greatly increased extraction of copper from the slag so that the slag when finally skimmed will have had practically all of its copper content removed and there will be no appreciable loss occasioned by its being thrown away.

As before stated, the process of the present invention may be carried out in various types of furnaces, several of which are illustrated in the drawings as also the flow sheet representing the steps in the process.

In the accompanying drawings:

Figure 1 is a horizontal sectional view illustrating one form of furnace to be employed in carrying out the process heretofore described;

Fig. 2 is a similar view illustrating a double furnace;

Fig. 3 is a view illustrating a further modified form of furnace;

Figure 4:
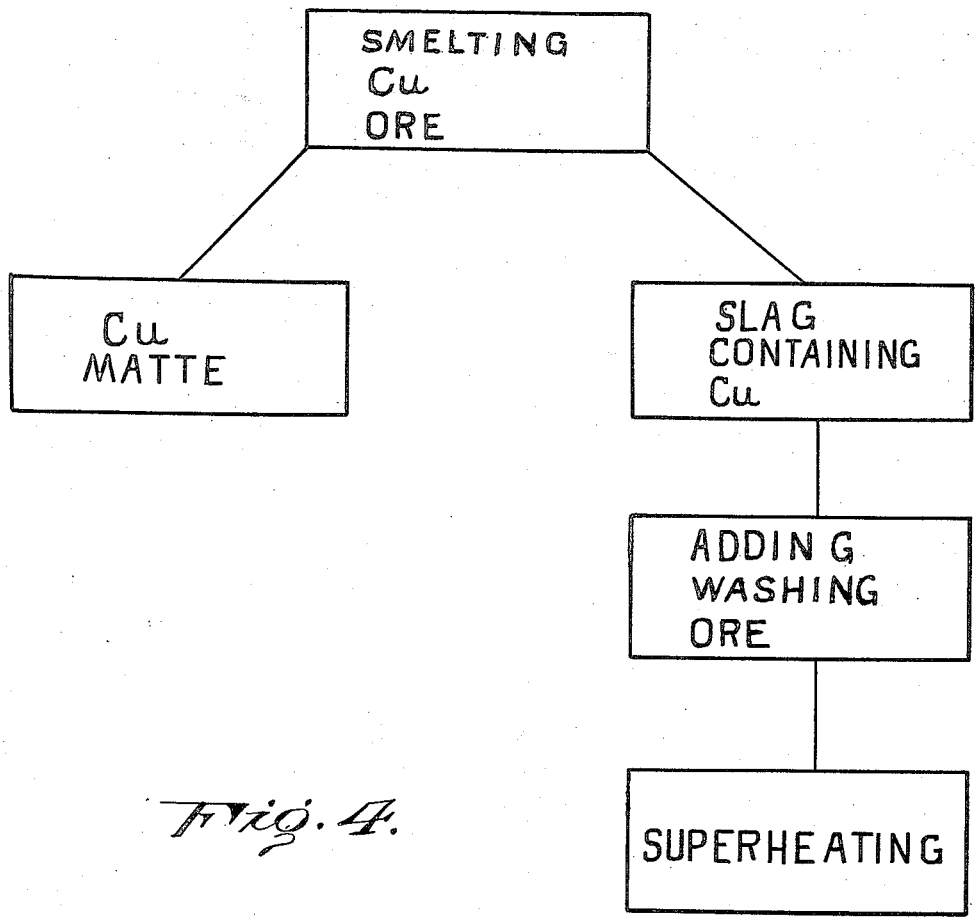
Fig. 4 is a diagrammatic view illustrating the steps involved in the process.

Figure 1 is a horizontal sectional view through a single furnace in which the operation of smelting and superheating are both carried out. As represented by the figure, a smelting blast is located at the firing end of the furnace and a superheating blast is located at the opposite or skimming end of the furnace, the furnace being provided with a flue located between its ends for the purpose of conducting off the gaseous products generated during the smelting process. At or near the skimming end, the furnace is provided with the usual slag skimming opening through which the slag may be removed, and along one side the furnace is provided with any suitable number of openings through which the charge is to be introduced into the furnace. This particular design of furnace has the advantage of permitting both the simple operation of smelting and the operation of superheating to be carried out in the single structure.

In that type of furnace illustrated in Fig. 2, it will be evident that there is in effect provided a double furnace or a furnace having two chambers in one of which the smelting process proper is carried out, and in the other the slag washing and superheating process or step. Thus in this type of furnace, in the smelting furnace proper, the original charge is subjected to the action of the smelting blast and the slag produced overflows into the washing and superheating furnace through any suitable overflow opening provided in a wall common to the two furnaces, or the slag may be conducted from one furnace to the other if the two furnaces are relatively spaced. Thus in the smelting furnace we have an opening through which the charge may be introduced and in one end of this furnace there is located a smelting blast, the furnace being provided at its other end with a flue for the escape of the gaseous products resulting from the smelting process, the slag flowing from the first to the last mentioned end of the furnace and overflowing, as stated, into one end of the washing and superheating furnace. In this latter furnace, near or at the said end, there is provided a superheating blast and near the other end of the said furnace there is provided a gas flue for the escape of the gaseous products. Also this latter furnace near its first mentioned end and, if desired, at intermediate points, is provided with an opening through which the washing ore may be introduced, and near the last mentioned end of this furnace there is an opening through which the slag may be removed.

By reference to Fig. 3 of the drawings it will be seen that the furnace in this view is, like the furnace illustrated in Fig. 1, of the single type and is provided in one end with a blast which is to serve both for smelting and superheating. The charge in this form of furnace is introduced at or near the opposite end thereof at which latter end the furnace is provided with a flue for the escape of the gases and in this type of furnace the slag as it is formed will flow in the direction of the first mentioned end, or, in other words, in the direction of the blast, the furnace being provided at suitable intervals with openings through which the washing ore may be introduced and, near its blast end, with an opening through which the slag may be removed.

The furnace illustrated in Fig. 2 has the advantage that temperature conditions both in the smelting and superheating of the charge may be more accurately controlled, the two blasts being independent of one another. The particular advantage for the type of furnace shown in Fig. 3 is that a single blast serves both for the smelting and superheating of the charge and may of course be controlled with greater facility than two separate blasts.

In operating any of the three types of furnaces illustrated and above generally described, as the charge is introduced into the furnace, the calcines which, per se, form mattes of the highest copper content are placed in the smelting end of the furnace, and then progressively in the direction of the flow of the slag the calcines which progressively produce the next lowest grades of matte are placed. By proceeding in this manner it will not be necessary to add as much of the washing ore, nor will it be necessary to superheat the slag to as high a degree as if there were no graduation of the several portions of the charge in accordance with the variation in copper content of their respective mattes.

In the ordinary operation of a reverberatory furnace, the slag at the time of its removal from the furnace has a temperature of approximately 2200° F. and, in carrying out our process, the superheating will vary from 75° F. to 250° F., depending of course upon the composition of the slags, the size of the unfused particles of the charge, and which require to be fused, and the quantity of washing ore which must be employed or the composition of the slag as it effects the specific gravity for facilitating the settling out of the matte prills.

Likewise, we have found in our practice that the quiescent period may vary from one to four hours, four hours having been found satisfactory with the most rebellious slags, but it is conceivable that where it is necessary on account of metallurgical conditions to run a slag of very high specific gravity, as for example a slag high in iron and low in silica and lime, this quiescent period may be of more than four hours duration.

In certain of the claims we will refer to a superheating degree of temperature such as will result in complete fusion of all particles of both the original charge and the washing ore. Also, in certain of the claims we will refer to the skimming zone of the furnace, and by this we mean that point within the furnace at and adjacent which the slag is skimmed or otherwise removed from the furnace and in which zone, in the operation of the furnace, there would be an imperfect settling out of the copper matte prills from the slag and an incomplete fusion of particles of the ore.

Also, in certain of the claims we will refer to the smelting zone of the furnace, and by this we mean the zone in which the smelting operation is, in ordinary reverberatory practice, most effectually performed. In the ordinary furnace and in the carrying out of the ordinary smelting process, this zone will constitute the space at and adjacent the firing end of the furnace. As before explained, the temperature within the furnace at the skimming end or, in other words, the end at which the slag is removed, is lower than that at the firing end. This smelting zone, however, need not, for the purposes of carrying out the process of the present invention, be, precisely speaking, located at one end of the furnace and therefore in referring to the step of subjecting the charge to heat in the smelting zone we do not necessarily mean that the portion of the charge in one end only of the furnace is subjected to such heat. For example, in that form of furnace shown in Fig. 2, the entire interior of the smelting chamber of the double furnace constitutes the smelting zone and the interior of the superheating chamber constitutes the skimming zone. Likewise in the form of furnace shown in Fig. 3, the combined smelting and superheating blast is located in the skimming zone, and yet there is a smelting temperature produced in the opposite end of the furnace so that this end may be considered as the smelting zone.

Having thus described the invention, what is claimed as new is:

1. In the smelting of copper ores, the process which consists in fusing copper bearing slag with a washing ore at a superheating degree of temperature.

2. In the smelting of copper ore, in the reverberatory furnace, the process which consists in adding to the slag, in the furnace, fluent ore and superheating to effect complete fusion.

3. In the smelting of copper ore, in the reverberatory furnace, the process of treatment of the slag to extract the copper content which consists in washing and superheating the slag in the skimming zone of the furnace.

4. The process of extracting copper from slag which consists in distributing fluent ore over the slag while the latter is molten, and subjecting the mixture to heat at a degree of temperature sufficiently high to cause complete fusion of the mixture.

5. The process of extracting copper from slag, in the reverberatory furnace, which consists in distributing over the slag while molten, fluent ore of a grade such that the matte therefrom will be of low copper content and high in iron sulphide, and subjecting the mixture to heat at a degree of temperature sufficiently high to cause fusion of the mixture.

6. The process of extracting copper from slag which consists in distributing over the slag while molten, fluent ore low in copper content and high in iron sulphide and of a specific gravity not higher than that of the molten slag, and subjecting the mixture to heat at a degree of temperature sufficiently high to cause complete fusion of the mixture.

7. The process of extracting copper from slag, in the reverberatory furnace, which consists in distributing over the slag while molten, fluent ore low in copper content and high in iron sulphide and of a specific gravity not greater than that of the slag to be treated, and the slag from which ore will be such that it will combine with the slag to be washed and form a fusible mixture, and subjecting the mass to heat at a degree of temperature sufficiently high to cause complete fusion of the mass.

8. The process of extracting copper from slag, in the reverberatory furnace, which consists in distributing over the slag while molten, fluent ore of a grade such that the matte formed in the fusion thereof will combine with the copper matte prills in the slag to be treated to produce matte prills of increased size and weight, and subjecting the mixture to heat at a degree of temperature sufficiently high to cause complete fusion of the mixture and to lower the viscosity of the mixture.

9. In the smelting of copper ore in the reverberatory furnace, the process which consists in introducing an initial charge, subjecting the charge to a smelting blast to produce the matte and slag, distributing a washing ore over the molten slag in the furnace, and subjecting the charge to a superheating blast.

10. In the smelting of copper ore, in the reverberatory furnace, the process which consists in introducing an initial charge into the furnace, subjecting the charge to heat from a smelting blast in one zone of the furnace, adding washing ore to the slag formed in the smelting operation, and subjecting the mixture to heat from a superheating blast in a relatively remote zone of the furnace.

11. In the smelting of copper ore, in the reverberatory furnace, the process which consists in subjecting the furnace charge to smelting heat in a smelting zone, adding a washing ore to the slag formed in the smelting operation, and subjecting the mixture to heat at a higher degree of temperature in a skimming zone of the furnace.

12. In the smelting of copper ore, in the reverberatory furnace, the process which consists in subjecting the charge to heat from a smelting blast in one zone of the furnace to produce the matte and slag, the latter flowing in the direction of another zone of the furnace, adding washing ore to the slag, and subjecting the mixture to heat from a smelting blast in the last mentioned zone.

13. In a smelting of copper ore, in the reverberatory furnace, the process which consists in subjecting the charge to heat from a smelting blast in one zone of the furnace to produce the matte and slag, the latter flowing in the direction of another zone of the furnace, and washing the slag and subjecting same to a higher degree of temperature from a superheating blast in the last mentioned zone of the furnace.

14. In the smelting of copper ore, in the reverberatory furnace, the process which consists in subjecting the charge to heat at a smelting temperature in one zone of the furnace to produce the matte and the covering layer of slag, the latter flowing in a direction from said zone, distributing a washing ore upon the slag, and superheating the mixture as it recedes from the said zone.

15. In the smelting of copper ore, in the reverberatory furnace, the process which consists in adding to the slag formed within the furnace, a quantity of a fluent washing ore, superheating the mixture to a temperature to effect complete fusion of all particles of the charge, and permitting the charge to remain quiescent for a period of time of such duration as to allow the copper matte prills to form and settle.

16. In the smelting of copper ore, in the reverberatory furnace, the process which consists in adding to the slag produced in the furnace, a quantity of a washing ore, subjecting the mixture to heat at such a degree as to effect complete fusion of all particles of the charge and to lower the viscosity of the slag, and permitting the charge to remain quiescent for a period of time of such duration as to allow the copper matte prills to settle out.

17. In the smelting of copper ore, in the reverberatory furnace, the process which consists in distributing the charge within the furnace in portions successively removed from the smelting zone of the furnace and which portions, in the order stated, will produce successively lower grades of matte, adding washing ore to the slag formed in the furnace, and subjecting the mixture to heat at a degree of temperature higher than that employed in the smelting zone.

18. In the smelting of copper ore, in the reverberatory furnace, the process which consists in distributing the charge within the furnace in portions successively removed from the smelting zone of the furnace and which portions, in the order stated are successively of a quality to produce mattes of relatively decreasing copper content, adding washing ore to the slag formed in the smelting operation and subjecting the mixture to heat at a superheating temperature.

19. In the smelting of copper ore, in the reverberatory furnace, the process which consists in distributing the charge within the furnace in portions successively removed from the smelting end of the furnace and which portions, in the order stated, are successively of a quality to produce mattes of relatively decreasing copper content, distributing upon the slag a fluent washing ore, and subjecting the mixture to heat at a degree of temperature such as to effect complete fusion of all particles of the mixture.

20. In the smelting of copper ore, in the reverberatory furnace, the process which consists in distributing the charge within the furnace in portions successively removed from the smelting end of the furnace and which portions, in the order stated, are successively of a quality to produce mattes of relatively decreasing copper content, distributing upon the slag a fluent washing ore, and subjecting the mixture to a superheating blast at a point removed from the smelting end of the furnace.

21. In the smelting of copper ore, in the reverberatory furnace, the process which consists in distributing the charge within the furnace in portions successively removed from the smelting zone of the furnace and which portions, in the order stated, are successively of a quality to produce mattes of relatively decreasing copper content, and subjecting the mixture, in the skimming zone of the furnace to heat at a temperature sufficiently high to effect complete fusion of all of the particles of the mixture.

22. In the smelting of copper ore, in the reverberatory furnace, the process which consists in distributing the charge within the furnace in portions successively removed from the smelting zone of the furnace and which portions, in the order stated, are successively of a quality to produce mattes of relatively decreasing copper content, subjecting the mixture, in the skimming zone of the furnace to heat at a temperature sufficiently high to effect complete fusion of all of the particles of the mixture and permitting the mixture to remain quiescent for a period of time of such duration as to allow the copper matte prills formed to settle out.

23. In the smelting of copper ore, in the reverberatory furnace, the process which consists in distributing the charge within the furnace in portions successively removed from the smelting zone of the furnace and which portions, in the order stated, are successively of a quality to produce mattes of relatively decreasing copper content, adding a washing ore to the slag formed, subjecting the mixture to heat at a superheating degree of temperature in the skimming zone of the furnace, and permitting the mixture to remain quiescent for a period of time of such duration as to allow settling out of the copper matte prills formed.

24. In the smelting of copper ore, in the reverberatory furnace, the process which consists in distributing upon the slag within the furnace fluent ore of a quality such that its matte will be of low copper content and high in iron sulphide, and subjecting the mixture to heat at a superheating degree of temperature in the skimming zone of the furnace.

25. In the smelting of copper ore, in the reverberatory furnace, the process which consists in distributing upon the slag within the furnace, fluent ore of a quality such that its matte will be of low copper content and high in iron sulphide, subjecting the mixture to heat at a superheating degree of temperature in the skimming zone of the furnace, and permitting the mixture to remain quiescent for a period of time of such duration as to allow the settling out of the copper matte prills.

26. In the smelting of copper ore, in the reverberatory furnace, the process which consists in distributing the charge within the furnace in portions successively removed from the smelting zone of the furnace and which portions, in the order stated, are successively of a quality to produce mattes of relatively decreasing copper content, distributing upon the slag of the charge a washing ore of such quality that matte produced therefrom will be of low copper content and high in iron sulphide, and subjecting the mixture to heat at a superheating degree of temperature in the skimming zone of the furnace.

27. In the smelting of copper ore, in the reverberatory furnace, the process which consists in distributing the charge within the furnace in portions successively removed from the smelting zone of the furnace and which portions, in the order stated, are successively of a quality to produce mattes of relatively decreasing copper content, distributing upon the slag of the charge a washing ore of such quality that matte produced therefrom will be of low copper content and high in iron sulphide, subjecting the mixture to heat at a superheating degree of temperature in the skimming zone of the furnace, and permitting the mixture to remain quiescent for a period of time of such duration as to allow settling out of the copper matte prills.

28. In a reverberatory furnace, a charge chamber having a charge opening at one end, and means at the other end of the chamber for producing a blast, the chamber at its last mentioned end having a skimming opening.

29. In a reverberatory furnace having a smelting zone and a skimming zone, means in the skimming zone for producing a superheating blast therein.

In testimony whereof we affix our signatures.

PERCIVAL PAGE BUTLER. [L. S.]
HARRY HOWARD STOUT. [L. S.]